United States Patent
Joy et al.

(10) Patent No.: US 12,498,973 B2
(45) Date of Patent: Dec. 16, 2025

(54) MONITORING OF RESOURCE CONSUMPTION PER TENANT

(71) Applicant: SAP SE, Walldorf (DE)

(72) Inventors: Robin Joy, Walldorf (DE); Ruediger Karl, Waibstadt (DE); Norman May, Karlsruhe (DE); Tobias Scheuer, Bruchsal (DE); Patrick Voelker, Mannheim (DE); Jaeyoung Choi, Seoul (KR); Hyogi Jung, Seoul (KR)

(73) Assignee: SAP SE, Walldorf (DE)

( * ) Notice: Subject to any disclaimer, the term of this patent is extended or adjusted under 35 U.S.C. 154(b) by 517 days.

(21) Appl. No.: 18/063,451

(22) Filed: Dec. 8, 2022

(65) Prior Publication Data
US 2024/0193006 A1 Jun. 13, 2024

(51) Int. Cl.
*G06F 9/50* (2006.01)
*G06F 11/30* (2006.01)

(52) U.S. Cl.
CPC .............. *G06F 9/5005* (2013.01); *G06F 9/50* (2013.01); *G06F 9/505* (2013.01); *G06F 9/5077* (2013.01); *G06F 11/3051* (2013.01); *G06F 2209/5011* (2013.01); *G06F 2209/5016* (2013.01)

(58) Field of Classification Search
None
See application file for complete search history.

(56) References Cited

U.S. PATENT DOCUMENTS

| 8,065,682 B2 * | 11/2011 | Baryshnikov | G06F 16/20 |
| | | | 718/100 |
| 2017/0213257 A1 * | 7/2017 | Murugesan | G06Q 30/0275 |
| 2018/0121426 A1 | 5/2018 | Barsness et al. | |
| 2023/0222124 A1 * | 7/2023 | Sun | G06F 16/2264 |
| | | | 707/714 |

FOREIGN PATENT DOCUMENTS

CN 104917793 A 9/2015

OTHER PUBLICATIONS

Communication: "Extended European Search Report", Mar. 27, 2024 (Mar. 27, 2024), European Patent Office, for European Application No. 23180803.1-1203, 10 pages.

Anonymous: "SAP HANA Multitenant Databas Containers Content" , Nov. 30, 2016 (Nov. 30, 2016), XP093042249, Retrieved from the Internet: URL:https://help.sap.com/doc/0987e3b51fb74e5a8631385fe4599c97/2.0.00/en-us/sap_hana_multitenant_database_containers_en.pdf, retrieved on Apr. 26, 2023.

\* cited by examiner

*Primary Examiner* — Qing Yuan Wu
(74) *Attorney, Agent, or Firm* — Buckley, Maschoff & Talwalkar LLC

(57) ABSTRACT

Systems and methods include reception, at a database instance hosting a plurality of database tenants, of a statement for execution in a first database session associated with a first tenant, determination of first tenant-level resource limits associated with the database session, determination, for one or more resources, of a total amount consumed by the first database session, determination, based on the first tenant-level resource limits and the total amount of the one (Continued)

or more resources consumed by the first database session, of whether the statement can be executed by the database instance in compliance with the first tenant-level resource limits, and execution of the statement if it is determined that the statement can be executed by the database instance in compliance with the first tenant-level resource limits.

12 Claims, 13 Drawing Sheets

| WKLD CLASS | SESSION VARIABLE VALUES |
|---|---|
| 1 | TENANT = TENANT_1 |
| 1a | TENANT = TENANT_1; APPLICATION COMPONENT NAME = SCM |
| 1b | TENANT = TENANT_1; APPLICATION COMPONENT NAME = CRM |
| 2 | TENANT = TENANT_2 |

| TENANT | WORKLOAD_CLASS | TOTAL_STATEMENT_MEMORY | TOTAL_STATEMENT_THREADS |
|---|---|---|---|
| TENANT_1 | CLASS 1 | ~~~~~~ | ~~~~~~ |
| TENANT_2 | CLASS 2 | ~~~~~~ | ~~~~~~ |
| TENANT_3 | CLASS 1 | ~~~~~~ | ~~~~~~ |

MONITORING OF RESOURCE CONSUMPTION PER TENANT

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide excellent separation of tenant data but it may be cost-inefficient in some scenarios to require a full database instance per tenant. For example, a smallest database instance may consume 32 Gb of memory, which may represent significantly more computing resources than should be required by a small tenant.

Other multi-tenant architectures use a single database instance to manage the data of multiple tenants. Since the data in such an architecture is not physically separated, the multi-tenant application is responsible for tracking and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application assigns a dedicated schema to each tenant. In either case, the database system is unaware of the existence of the multiple tenants and operates in the same manner as if it were being accessed by a single-tenant application.

Multi-tenant architectures that use a single database instance to manage the data of multiple tenants allow the sharing of resources (e.g., processor cycles, memory) between tenants while maintaining tenant-specific data isolation. Sharing the same resources may result in "noisy neighbor" effects, where one tenant or a few tenants use the majority of available resources and cause unpredictable performance degradations for the other tenants. Systems to efficiently manage the sharing of resources between database tenants are desired.

BRIEF DESCRIPTION OF THE DRAWINGS

FIG. 13 is a tabular representation of a view for monitoring tenant resource consumption according to some embodiments.

DETAILED DESCRIPTION

Figure 1:
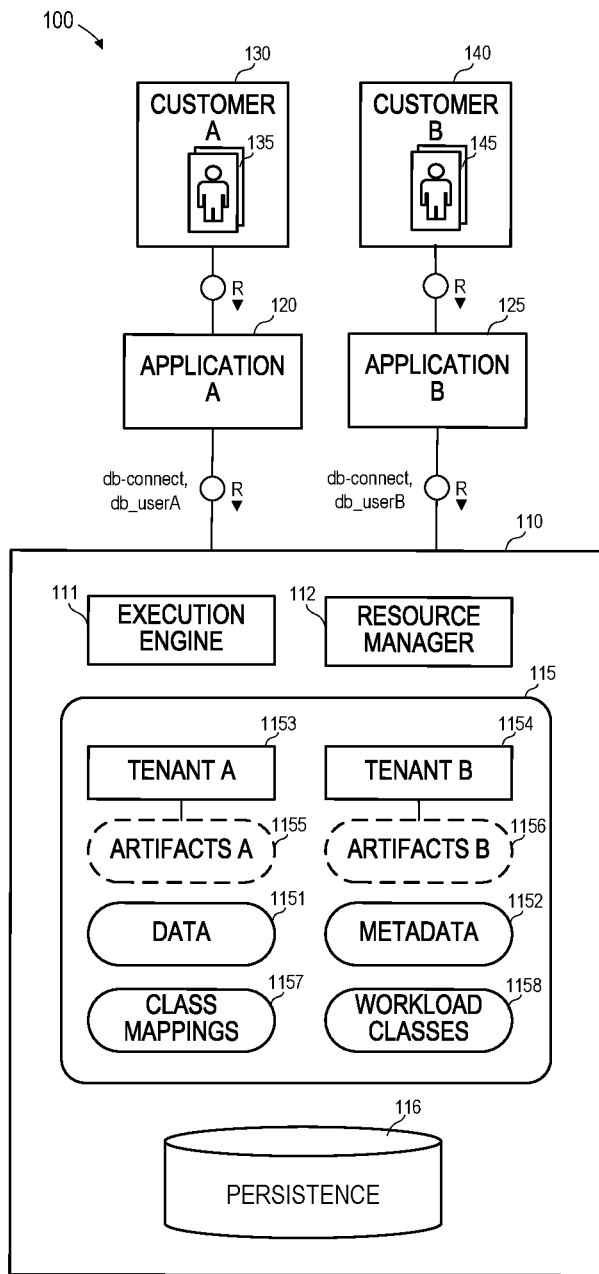
FIG. 1 is a block diagram of a database system providing native multi-tenancy and tenant-level resource isolation according to some embodiments.

The following description is provided to enable any person in the art to make and use the described embodiments. Various modifications, however, will be readily-apparent to those in the art.

Embodiments provide configurable and enforceable resource limits per tenant. These features ensure predictable performance per tenant and address the "noisy neighbor" effect. Some embodiments allow the definition of statement-specific resource limits and global resource limits which apply to all executed statements associated with a tenant.

A workload class defines resources available to database clients. A workload class may specify a limit for each of various resources (e.g., threads, memory, network I/O, disk I/O, disk size). A workload mapping maps different sets of session variable values to respective workload classes. When a database client connects to the database, the workload mapping is used to determine a workload class based on the session variable values of the connection. All statements submitted by the database client are then executed so as to conform to the resource limits of the determined workload class.

According to some embodiments, a session variable which identifies a tenant (e.g., "TENANT_NAME") is used to determine a workload class for a database session. The workload class to which a tenant is mapped defines resource limits for all statements executed on behalf of the tenant. Embodiments may also define a hierarchy of workload classes, including child workload classes which inherit the resource limits specified by a parent workload class. Accordingly, a parent workload class may map to a tenant and define total resource limits for the tenant (e.g., total_statement_memory_limit, total_statement_thread_limit), whereas child workload classes of the parent workload class may add corresponding statement-specific resource limits (e.g., statement_memory_limit, statement_thread_limit) and/or other statement-specific resource limits (e.g., query timeout, priority) to be enforced on each statement executed under the tenant.

According to some embodiments, a native multi-tenant database system includes a database-level tenant object (e.g., a database catalog object) which facilitates the implementation of multi-tenant architectures on the application layer. A tenant object is a logical collection of data as well as metadata artifacts which have been assigned to a tenant. Tenants may be exposed as first-class database objects (i.e., having an identity independent of any other database entity).

The database artifacts assigned to a particular instantiation of a tenant object (i.e., a particular tenant) may include, but are not limited to, data of one or more schemas, tables, and partitions, as well as metadata defining views on the tenant's tables, virtual tables, remote sources, and database users. Advantageously, the lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

A native multi-tenant database system may include one or more database instances, the data of all tenants, and the engines for processing the data. The single system also includes a single persistence for the data of all the tenants. By allowing multiple, independent tenants, or rather customers, to be hosted on a single instance and share computing resources, deployment of a new tenant to a database instance is associated with a near-zero marginal cost. The latter comes at a cost of lower isolation between the different tenants. Moreover, embodiments enable a pay-per-use model by having a finer granularity than that required for provisioning a separate database instance.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/or any other metric.

Database instance 110 provides native multi-tenancy according to some embodiments. Database instance 110 may be provisioned on any suitable combination of hardware and software, including one or more computer servers or virtual machines. In some embodiments, database instance 110 comprises a containerized application executing within a software container. Such containers may be implemented by one or more nodes of a cluster (e.g., a Kubernetes cluster) as is known in the art.

Database instance 110 includes execution engine 111 for responding to client queries based on data and metadata stored in volatile (e.g., Random Access) memory 115. Memory 115 includes data 1151 and metadata 1152 of all tenants assigned to database instance 110. Data 1151 may include row store tables, column store tables, and system tables. As is known in the art, the data of each row of a row store table is stored in contiguous memory locations of memory 115, and the data of columns of column store tables is stored in contiguous memory locations of memory 115. The system tables may store metadata defining a database catalog, users, etc. Memory 115 also stores program code and stack, and memory required for temporary computations and database management.

Each tenant of system 100 will be described as corresponding to a customer, where a customer may be a company, a division, a workgroup, or any other group of users. A tenant may correspond to a particular cloud resource/service subscription of a given customer. In this regard, a customer may be associated with more than one subscription and therefore more than one tenant.

Memory 115 includes tenant instance 1153 of tenant 'A' and tenant instance 1154 of tenant 'B'. Each tenant instance 1153 and 1154 is an instance of a tenant object defined in metadata 1152. Tenant instances 1153 and 1154 may be stored within data 1151 but are depicted separate therefrom for ease of understanding.

Each tenant instance 1153 and 1154 is a collection of database artifacts. The artifacts assigned to each tenant instance 1153 and 1154 are stored among data 1151 and metadata 1152. Accordingly, artifacts A 1155 assigned to tenant instance 1153 and artifacts B 1156 assigned to tenant instance 1154 are depicted using dashed lines to represent references to database artifacts of data 1151 and metadata 1152. The database artifacts assigned to a tenant instance may include, for example, one or more schemas, tables, and partitions. The database artifacts may also include metadata defining views on the tenant's tables, virtual tables, and remote sources.

Memory 115 also includes class mappings 1157 and workload classes 1158. Each of class mappings 1157 associates sets of one or more session variable values with a workload class 1158. The session variable values of each of class mappings 1157 may include, for example, values of session variables Tenant, Application, ApplicationUser, and/or ApplicationComponent. Other session variables may be used as is known in the art.

Class mappings 1157 may be used to determine a workload class for a given database session associated with certain session variable values. As will be described below, the resource consumption of the database session will be monitored and controlled based on the determined workload class. In some embodiments, a mapping 1157 is identified which includes the largest number of session variable values matching the session variable values of the current database session. The workload class of the specified mapping is then determined to be the workload class of the database session.

Figure 2:
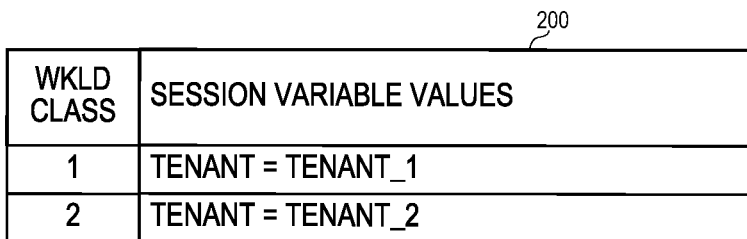
FIG. 2 is a tabular representation of workload class mappings according to some embodiments.

FIG. 2 illustrates a tabular representation of class mappings 200 according to some embodiments. Class mappings 200 include two rows, each of which represents a class mapping. Each of the two class mappings specifies a value of a single session variable (i.e., Tenant). Embodiments are not limited thereto. The first row of class mappings 200 maps a database session associated with the session variable Tenant=Tenant_1 to workload class '1', while the second row of class mappings 200 maps a database session associated with the session variable Tenant=Tenant_2 to workload class '2'.

Figure 3:
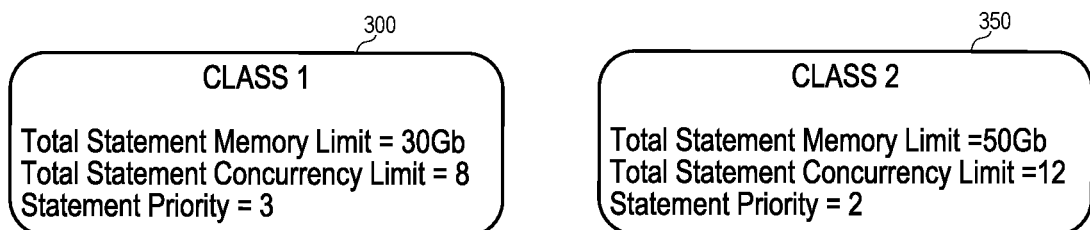
FIG. 3 illustrates parameter values of workload classes according to some embodiments.

Each of workload classes 1158 specifies parameters related to resource consumption. FIG. 3 includes representations of workload class 300 and workload class 350 according to some embodiments. Workload class 300 corresponds to class 1 of mapping 200 and workload class 350 corresponds to class 2 of mapping 200.

Each of workload classes 300 and 350 includes parameter, value pairs associated with resource consumption of a database session. The values of the TotalStatementMemoryLimit and TotalStatementConcurrencyLimit parameters are to be enforced against all simultaneously-executing statements of a database session of a tenant. As will be further described below, workload classes 300 and 350 are "parent" workload classes because they only define aggregate, rather than per-statement limits. Parent workload classes may also define statement priority. Other parameters may be used as is known in the art, including but not limited to statement-specific parameters such as StatementThreadLimit, StatementMemoryLimit, StatementTimeout and WriteTransactionLifetime If a workload class 1158 is determined for a database session as described above, database instance 110 executes statements associated with the database session such that the resources consumed thereby comply with the parameters of the workload class 1158. In one example, the parameters of the determined workload class 1158 are used to set values of corresponding resource-related variables in the session context or in the statement context of statements of the session. Resource manager 112 may read these resource-related variables and manage execution engine 111 to comply therewith, as will be described in more detail below.

For example, it is assumed that a session context of a database session of database instance includes the session variable Tenant=Tenant1. A session layer of database instance 110 may use mappings 200 to determine workload class 1 based on this session context and adds the parameter values of workload class 300 to the session context. Resource manager 112 reads the parameter values from the session context and manages the execution of all statements associated with this database session based on the parameter values. In particular, resource manager 112 may ensure that the total memory consumed by concurrently-executing statements of the database session does not exceed 30 Gb and that all concurrently-executed statements do not use more than eight threads in total. Moreover, each statement of the database session is assigned an execution priority of 3 (e.g., assigned to a job queue associated with priority 3).

In another example, a session context of a database session of a database instance includes the session variable Tenant=Tenant2. The session layer of database instance 110 may therefore use mappings 200 to determine workload class 2 based on this session context to add the parameter values of workload class 350 to the session context. Resource manager 112 reads these parameter values and operates to ensure that the total memory consumed by concurrently-executing statements of the database session does not exceed 50 Gb, that no more than twelve threads are used by all concurrently-executed statements, and that each statement of the database session is assigned an execution priority of 2.

Figures 4, 5:
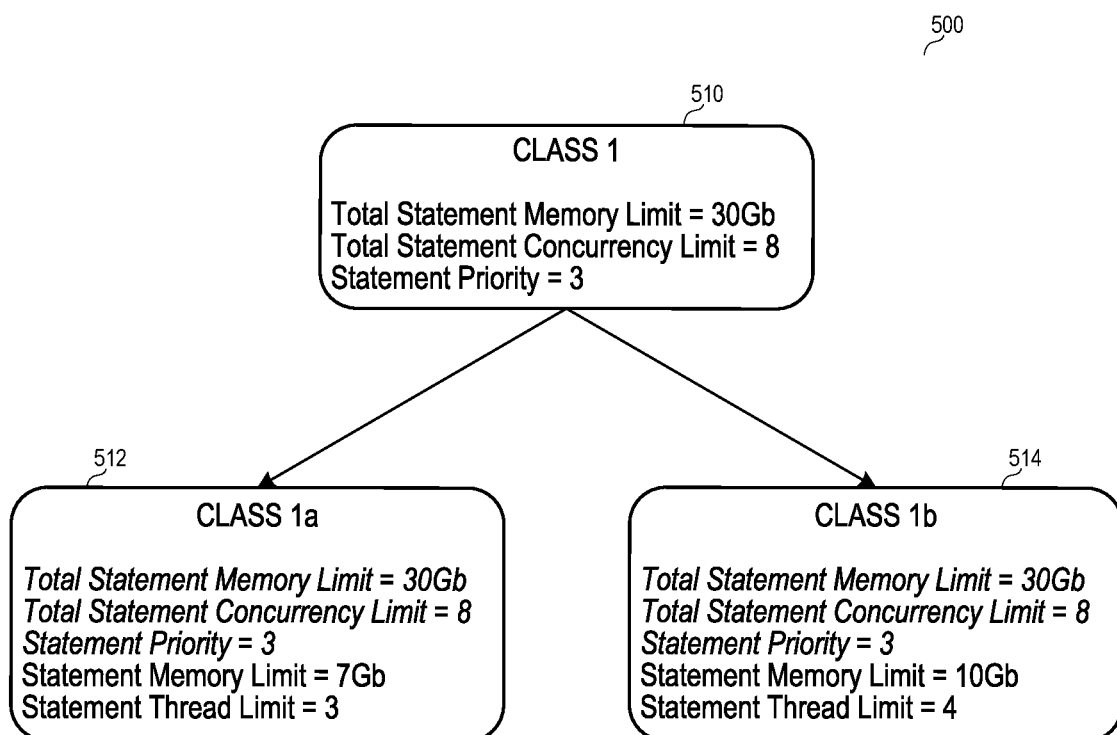
FIG. 4 is a tabular representation of workload class mappings according to some embodiments.
FIG. 5 illustrates parameter values of a hierarchy of workload classes according to some embodiments.

FIG. 4 illustrates class mapping 400 according to some embodiments. Class mapping 400 maps workload classes 1 and 2 to session variable values as described above and also includes mappings to workload classes 1a and 1b. Classes 1a and 1b are descendant classes of class 1 and, in this example, are mapped to the same session variable values as class 1 as well as to additional session variable values. When using class mappings 400 to determine a workload class based on session variables values of a database session, the determined workload class is the class associated with the most session variable values which match the session variables of the database session. In the present example, if the session variables values of a database session include Tenant=Tenant_1 and no ApplicationComponentName value, workload class 1 is determined. If the session variables values of a database session include Tenant=Tenant_1 and ApplicationComponentName=SCM, workload class 1a is determined. If the session variables values of a database session include Tenant=Tenant_1 and ApplicationComponentName=CRM, workload class 1b is determined. Some session variables may be assigned higher priority than other session variables in order to resolve ties during the determination of the workload class.

According to some embodiments, a child workload class inherits those parameter values of its ancestor workload classes which are related to total statement limits. FIG. 5 illustrates hierarchy 500 of workload classes 510, 512 and 514 respectively corresponding to workload classes 1, 1a and 1b of mappings 400. Italicized parameter, value pairs of workload classes 512 and 514 depict parameter, value pairs inherited from workload class 510.

In some embodiments, a session layer which determines workload class 512 for a given database session adds the parameter values of workload class 512 and of workload class 510 to the session context for the database session. The foregoing arrangement is particularly suited for establishing tenant-wide total resource limits (e.g., in a parent workload class) and statement-specific resource limits within a tenant (e.g., in a child workload class). Embodiments are not limited to two-level hierarchies such as hierarchy 500. For example, a child workload class of workload class 512 may establish resource limits for specific application users defined within a session context.

Returning to FIG. 1, database instance 110 also includes persistence 116 for persisting data 1151 and metadata 1152 of all assigned tenants. Persistence 116 may be implemented using any persistent data storage system that is or becomes known, including but not limited to distributed data storage systems. Persistence 116 may persist transaction logs and other database artifacts as is known in the art.

Database instance 110 thereby provides a single data server including the data and metadata of all tenants of the database instance, engines for processing the data, and a single persistence for the data and metadata. Hosting multiple independent tenants on such a single database instance facilitates sharing of computing resources at near-zero marginal cost.

Applications 120 and 125 may comprise SaaS applications but embodiments are not limited thereto. Applications 120 and 125 may be provisioned on a same or different one or more computer servers or virtual machines and may comprise containerized applications executing within a software container. Applications 120 and 125 may issue queries (e.g., SQL, MDX) to database instance 110 based on input received from users 135 and 145 of customers 130 and 140, respectively.

It will be assumed that customer A 130 corresponds to tenant A 1153 of database instance 110 and that customer B 140 corresponds to tenant B 1154 of database instance 110. Upon receipt of input from a user 135 of customer A 130, application 120 may transmit a query to database instance 110 which indicates an association with tenant A 1153. Similarly, upon receipt of input from a user 145 of customer B 140, application 125 may transmit a query to database instance 110 along with an indication that the query is associated with tenant B 1154. Upon receipt of a query, database instance 110 processes the query using execution engine 111, resource manager 112, and the artifacts assigned to the tenant with which the query is associated.

Figure 6:
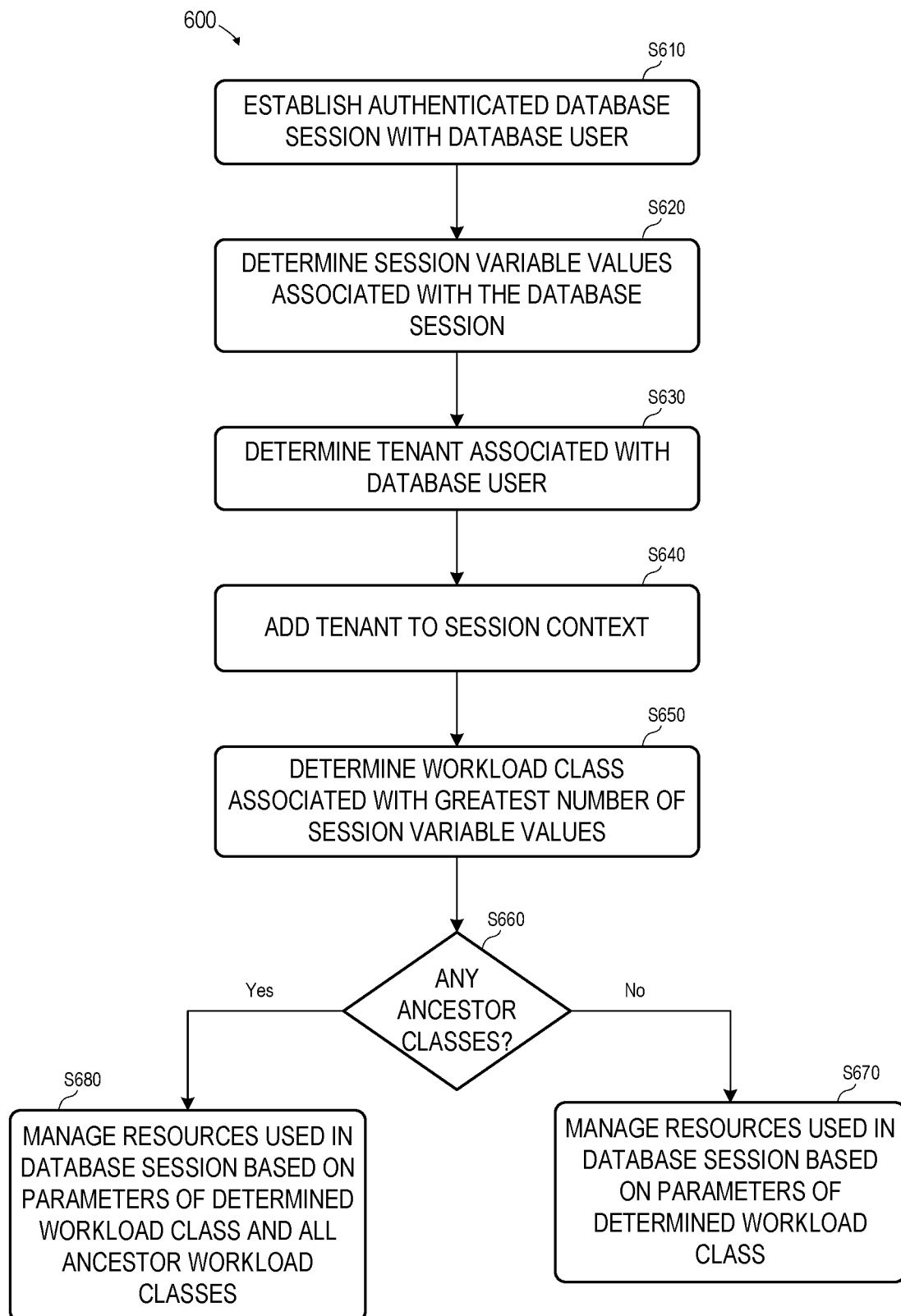
FIG. 6 is a flow diagram of a process to determine tenant-specific workload classes according to some embodiments.

FIG. 6 comprises a flow diagram of process 600 to implement tenant-level resource isolation according to some embodiments. Process 600 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

It is assumed that a tenant is provisioned in a database instance prior to process 600. According to some embodiments, provisioning of a tenant includes creation of a tenant object instance (i.e., a tenant) under a tenant manager user account. The tenant object instance is associated with a tenant ID which represents the tenant. Typically, a database user account is then created and is associated with the tenant. More than one database user account may be associated with a single tenant.

Database artifacts are assigned to the tenant. Some embodiments may use a deployment infrastructure to define database artifacts to assign to a tenant. The deployment infrastructure may provide a declarative approach for defining database objects (e.g., as design-time artifacts) using containers. For example, a service broker may create a container which corresponds to a database schema and additional metadata (e.g., user, roles, privileges) which may then be assigned to a tenant instance. Such containers may be isolated from each other by schema-level access privileges.

An authenticated database session is established with a database user at S610. The database user may comprise an application, an individual, or any other entity capable of authenticating to the database under a database user account defined within the database instance. Authentication may be performed using any suitable authentication protocol (e.g., multi-factor authentication)

Figure 7:
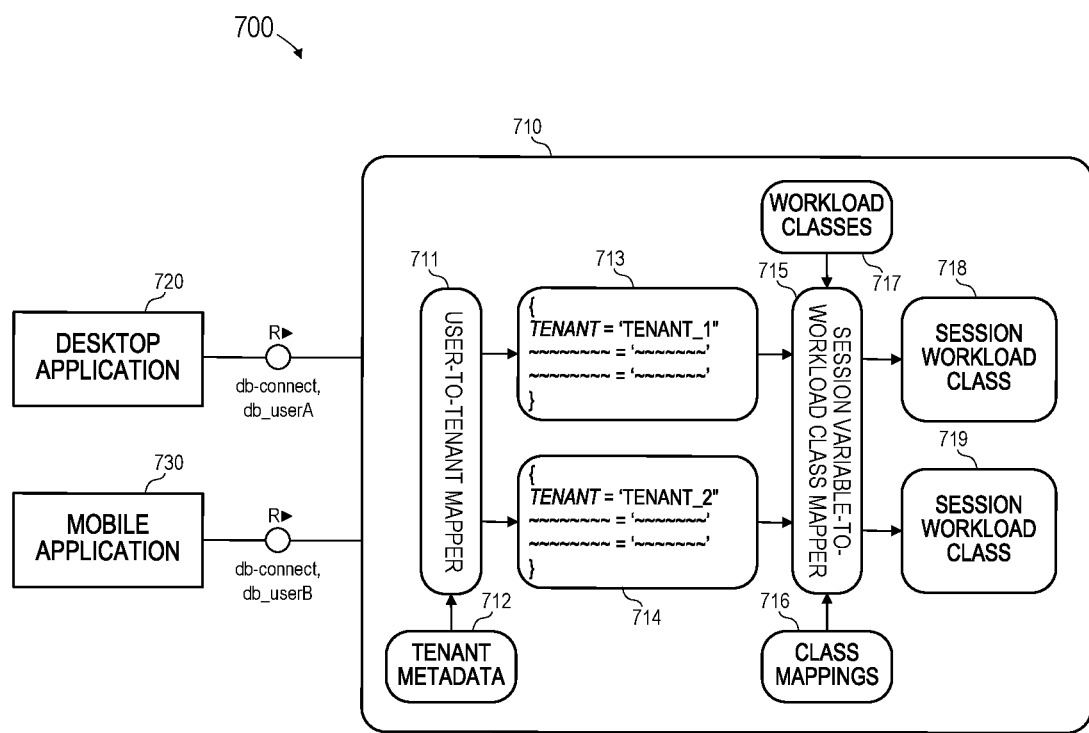
FIG. 7 is a block diagram to illustrate determination of one or more workload classes for tenant-specific database sessions according to some embodiments.

FIG. 7 illustrates architecture 700 for describing an implementation of process 600. Initially, it is assumed that a user operates desktop application (which may comprise a Web application executing within a Web browser) to establish an authenticated database session with database instance 710 under database user account db_userA.

Next, at S620, session variable values associated with the database session are determined. In some examples, a client context including zero or more session variables is passed to database instance 710 during establishment of a database session. The session variable values may include, but are not limited to, values of Application, ApplicationUser, and/or ApplicationComponentName.

A tenant associated with the database user is determined at S630. As described above, one or more database users may be assigned to a tenant within database instance 710. The assignment of database users to tenants may be stored in tenant metadata 712 of database instance 710.

Figure 8:
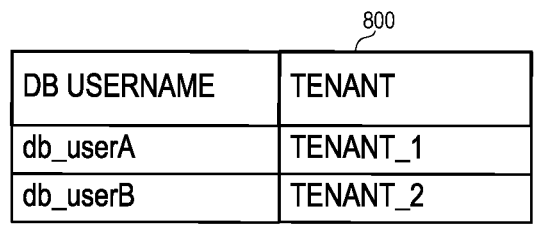
FIG. 8 is a tabular representation of a database user-to-tenant mapping according to some embodiments.

FIG. 8 is a tabular representation of a portion of tenant metadata 800 according to some embodiments. Tenant metadata 800 maps tenants to one or more database usernames. Accordingly, at S630, user-to-tenant mapper 711 uses metadata 712 to determine a tenant to which the database user of the current database session is mapped. In the present example, user-to-tenant mapper 711 determines the tenant Tenant_1 based on metadata 712. User-to-tenant mapper 711 may comprise a component of a session layer of database instance 710, User-to-tenant mapper 711 adds the determined tenant to the session context at S640. For example, as depicted in FIG. 8, user-to-tenant mapper 711 may add a session variable Tenant having the value Tenant_1 to session context 713. It may be advantageous to use a user-to-tenant mapper because the user is authenticated against the database, and thus is trusted information. The tenant_name session variable—like most session variables—might not be thusly protected. As such, a malicious user could set any desired value to the tenant_name session variable.

Next, at S650, the workload class associated with the greatest number of session variable values of the current session context is determined. The determination may be performed by session variable-to-workload class mapper 715 based on class mappings 716 as described above, in which each of one or more workload classes 717 is associated with a respective set of session variable values. Session workload class 718 of FIG. 7 is the determined workload class according to the present example.

S660 includes a determination of whether the determined workload class is associated with any ancestor workload classes, as described above with respect to workload class hierarchy 500. If not, the computing resources used in the database session are managed at S670 based on the parameter values of the determined workload class. The parameter values may specify session-specific resource limits, statement-specific resource limits, or other resource limits that are or become known. If the determined workload class is associated with any ancestor workload classes, the computing resources used in the database session are managed at S680 based on the parameter values of the determined workload class and on the parameter values of the ancestor workload classes. According to some embodiments, the parameter values are added to the session context at S670 or S680 to assist the desired management of the computing resources.

FIG. 7 also depicts mobile application 730 which establishes an authenticated session with database instance 710 under a different database username (i.e., db_userB). Process 600 may be executed in response to this authentication as described above in order to determine that database user db_userB corresponds to Tenant_2 based on tenant metadata 712, and to determine session workload class 719 based on session variable values of session context 714, class mappings 716 and workload classes 717.

Figure 9:
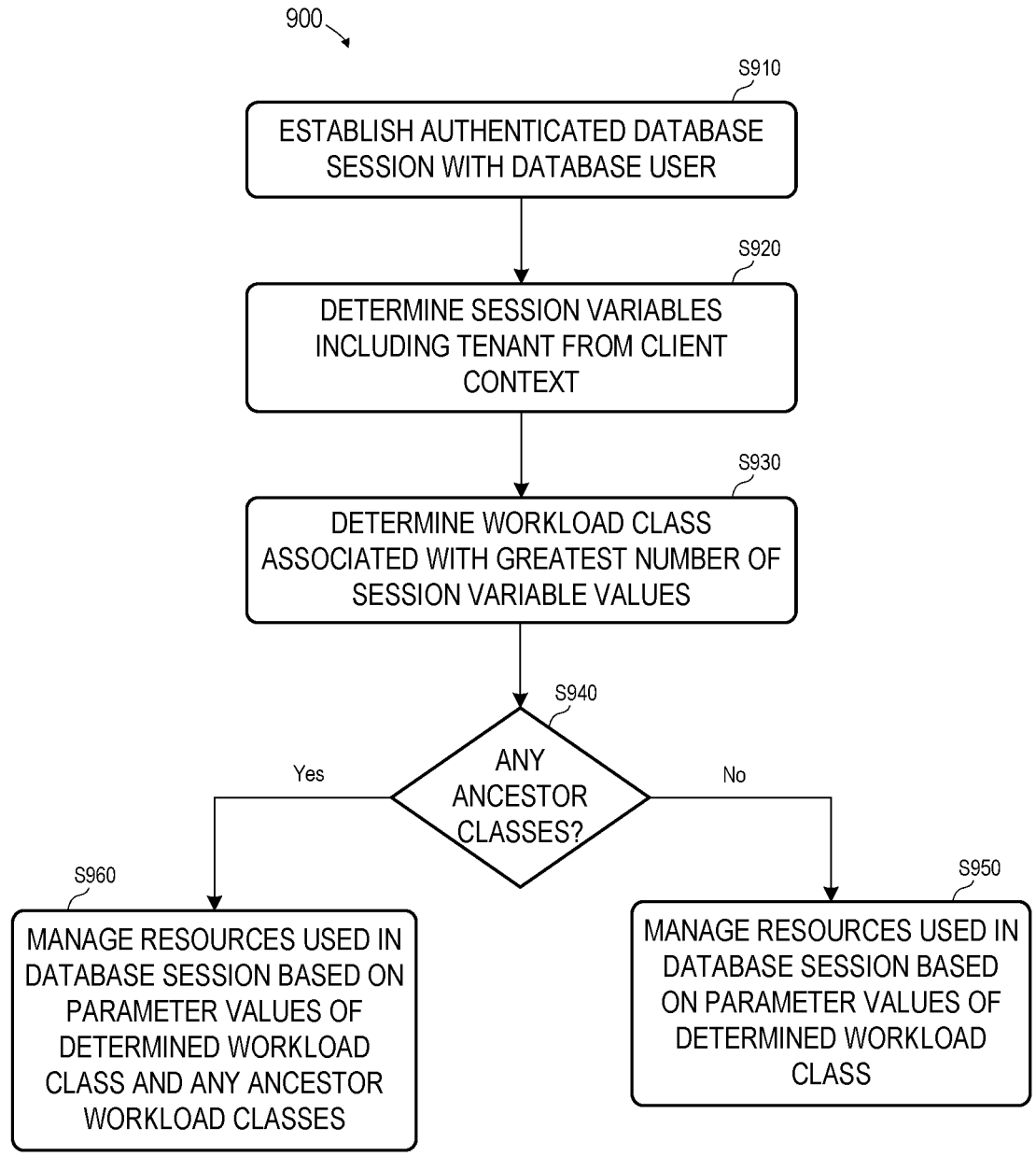
FIG. 9 is a flow diagram of a process to determine tenant-specific workload classes according to some embodiments.

FIG. 9 is a flow diagram of process 900 to provide tenant-specific resource management according to some embodiments. An authenticated database session is established with a database user at S910 as described above. The database user may comprise an application, an individual, or any other entity, and the authentication is associated with a database user account defined within the database instance.

Figure 10:
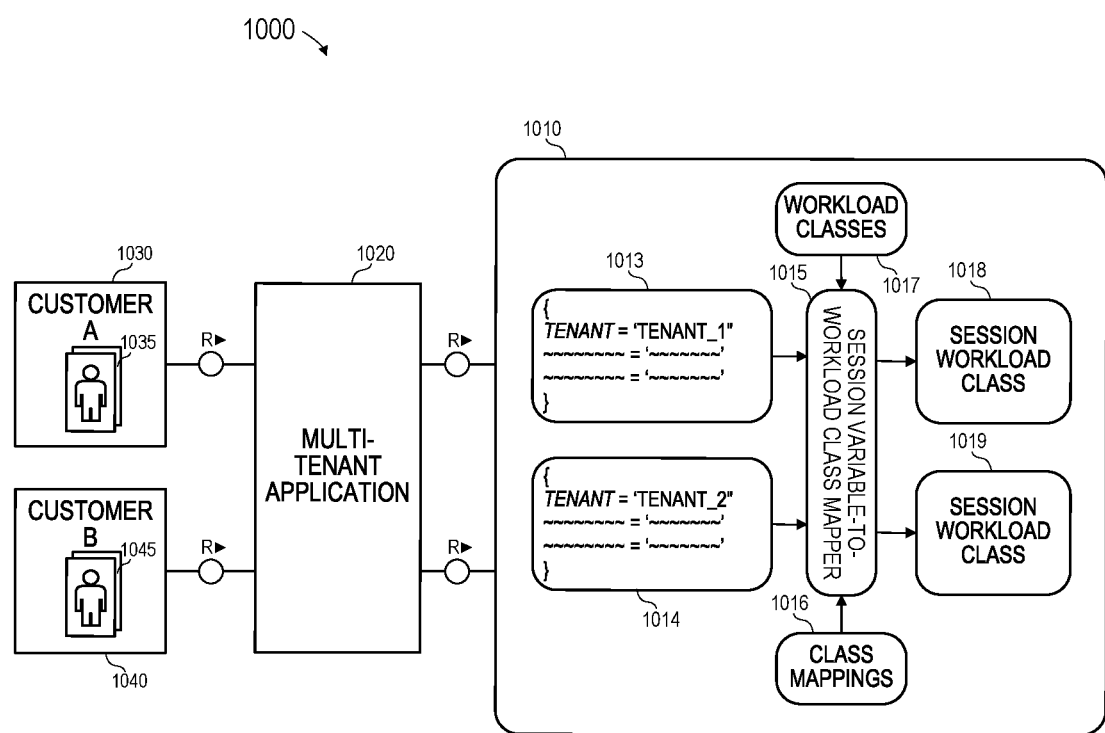
FIG. 10 is a block diagram to illustrate determination of one or more workload classes for tenant-specific database sessions according to some embodiments.

FIG. 10 illustrates architecture 1000 for describing an implementation of process 900. Multi-tenant application 1020 may comprise a SaaS application but embodiments are not limited thereto. Multi-tenant application 1020 may be provisioned on one or more computer servers or virtual machines and may comprise a containerized application executing within a software container. Multi-tenant application 1020 issues queries (e.g., SQL, MDX) to database instance 1010 based on input received from users 1035 and 1045 of customers 1030 and 1040, respectively.

It will be assumed that customer A 1030 corresponds to a first tenant (i.e., Tenant_1) of database instance 1010 and that customer B 1040 corresponds to a second tenant (i.e., Tenant_2) of database instance 1010. Multi-tenant application 1020 is able to determine the tenant which corresponds to a user from whom input is received. For example, each user may logon to multi-tenant application 1020 using a tenant-specific subscription. Multi-tenant application 1020 therefore associates a user with the tenant of the subscription under which the user has logged on. In another example, communications between users and multi-tenant application 1020 may include tenant-identifying tokens.

Multi-tenant application 1020 is also aware of which tenants are placed on which database instances. In this regard, multi-tenant application 1020 may request provisioning of database instances and creation of tenants on provisioned database instances. Upon receiving input from a user associated with a given tenant, multi-tenant application 1020 is able to determine the database instance which includes the given tenant and to which a corresponding query should therefore be directed.

Upon receipt of input from a user 1035 of customer A 1030, multi-tenant application 1020 may communicate with database instance 1010 to establish an authenticated session therewith, for example under database user account dbuser_A. Similarly, upon receipt of input from a user 1045 of customer B 1040, multi-tenant application 1020 may communicate with database instance 1010 to establish a separate authenticated session under database user account dbuser_B.

At S920, session variable values associated with the database session are determined from client context. For example, multi-tenant application 1020 may pass a client context including zero or more session variables to database instance 1010 during establishment of a database session. Unlike the example of FIG. 7, the session variable values of the client context passed by multi-tenant application 1020 include a value of a Tenant session variable. Session context 1013 includes session variable Tenant=Tenant_1 received in a client context from multi-tenant application 1020 according to some embodiments. Since the value of the Tenant session variable is received directly from multi-tenant application 1020, a session layer of database instance 1010 need not use a database user-to-tenant mapping to determine a tenant of database session. In contrast to the embodiment discussed above, this embodiment requires a trusted and secured way to set the tenant_name session variable.

Next, at S930, the workload class associated with the greatest number of session variable values of the current session context is determined. Class mappings 1016 may associate each of one or more workload classes 1017 with a respective set of session variable values. The determination at S930 may therefore be performed by session variable-to-workload class mapper 1015 based on class mappings 1016. In the present example, session workload class 1018 is determined at S930. In the case of session context 1014 of a database session associated with customer B 1040, session workload class 1019 may be determined based on session variable values of session context 1014, class mappings 1016 and workload classes 1017.

At S940, it is determined whether any ancestor workload classes of the determined workload class exist. If not, the computing resources used in the database session are managed at S950 based on the parameter values of the determined workload class. As described above, the parameter values may specify session-specific resource limits, statement-specific resource limits, or other resource limits that are or become known. If the determined workload class is associated with any ancestor workload classes, the computing resources used in the database session are managed at S960 based on the parameter values of the determined workload class and on the parameter values of each of the ancestor workload classes. The parameter values may be added to the session context at S950 or S960 to facilitate management of the computing resources in accordance therewith.

Figure 11:
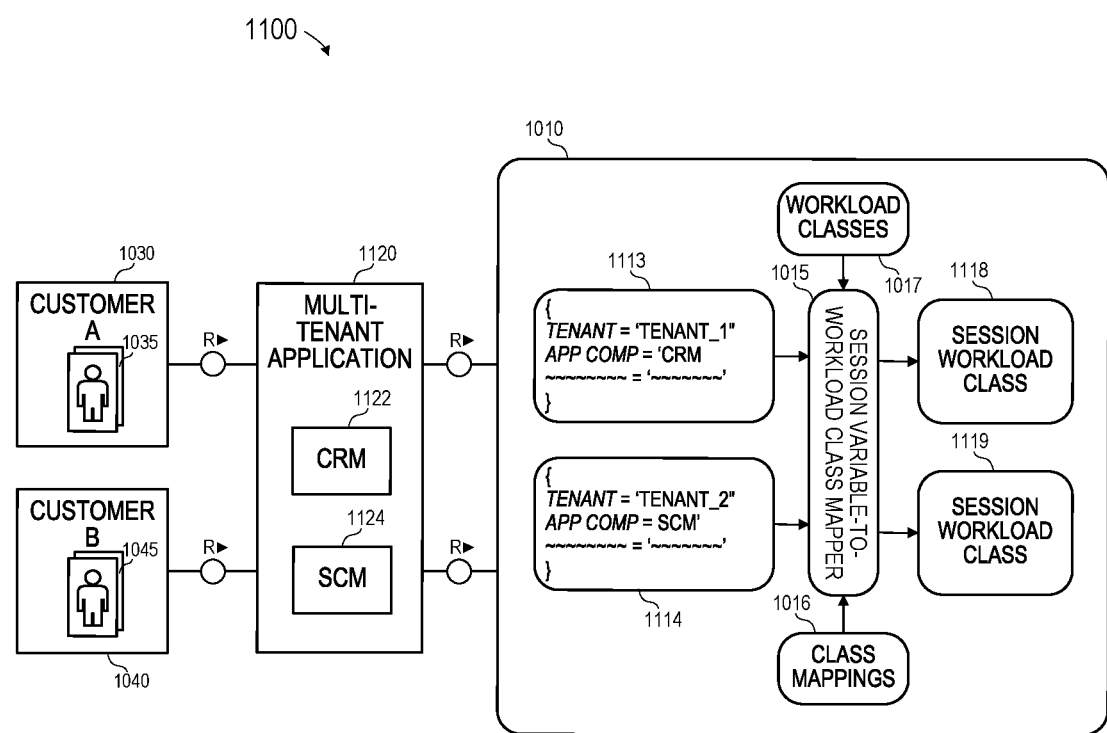
FIG. 11 is a block diagram to illustrate determination of one or more workload classes for tenant-specific database sessions according to some embodiments.

FIG. 11 is a block diagram of architecture 1000 of FIG. 10 in which multi-tenant application 1120 includes customer relationship management (CRM) component 1122 and supply chain management (SCM) component 1124. It will be assumed that a user 1035 of customer A 1030 operates CRM component 1122 to request data from database instance 1010 and a user of customer B 1040 operates SCM component 1124 to request data from database instance 1010.

As a result, and for each of the two database sessions, multi-tenant application 1120 passes a client context to database instance 1010 which includes session variable values for session variables Tenant and ApplicationComponentName. These session variable values are added to the respective session contexts of the database sessions. As shown in FIG. 11, session context 1113, corresponding to the database session with a user 1035 of customer A 1030, includes session variable values Tenant=Tenant_1 and ApplicationComponentName (i.e., App Comp)=CRM. Session context 1114 corresponds to the database session with a user 1045 of customer B 1040 and includes session variable values Tenant=Tenant_2 and ApplicationComponentName (i.e., App Comp)=SCM.

Session workload classes 1118 and 1119 are determined based on contexts 1113 and 1114, respectively, class mappings 1016 and workload classes 1017. Class mappings 1016 may map a same Tenant session variable value of a session context to different ones of workload classes 1017 depending on whether the session context includes ApplicationComponentName=CRM or ApplicationComponentName=SCM as shown in FIG. 4.

Figure 12:
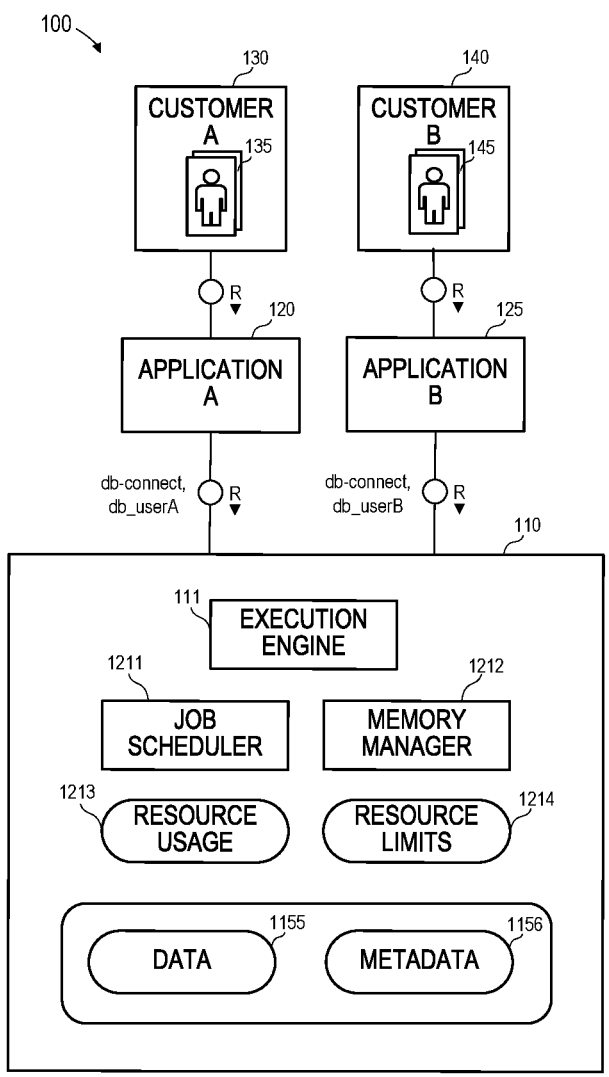
FIG. 12 is a block diagram of an architecture to manage tenant-specific resource limits according to some embodiments.

FIG. 12 is a block diagram of architecture 100 showing some components of database instance 110 which are not shown in FIG. 1. In particular, database instance 110 of FIG. 12 includes job scheduler 1211, memory manager 1212, resource usage 1213 and resource limits 1214. These components of database instance 110 may be used in some embodiments to manage resource limits associated with workload classes.

Resource limits 1214 specifies parameter values of resource limits to apply to database sessions hosted by database instance 110. Accordingly, resource limits 1214 may comprise resource-related session variable values specified by workload classes as described above. Resource limits 1214 may indicate, for each executing database session, concurrency limits, memory limits (total and/or per statement), priority, etc.

Resource usage 1213 records current resource usage within database instance 110. According to some embodiments, resource usage 1213 may track resource usage data by tenant in order to facilitate enforcement of tenant-level resource limits. FIG. 13 is a tabular representation of portion 1300 of an example of resource usage data 1213. As shown, portion 1300 specifies, for each tenant of a database instance, a workload class determined for database sessions associated with the tenant, a total amount of memory currently used to execute statements associated with the tenant, and a total number of execution threads in use to execute statements associated with the tenant. Although portion 1300 reflects a 1-1 relationship between tenants and workload classes, it should be noted that a database session associated with a given tenant may be mapped to one of several workload classes depending on the other session variable values of the database session.

In order to execute statements received from clients such as application A 120 and application B 125, execution engine 111 presents associated tasks (i.e., jobs) to job scheduler 1211. Job scheduler 1211 places the tasks on job queues and the queued tasks are executed by a pool of threads of database instance 110. According to some embodiments, job scheduler 1211 places tasks on job queues based on the data of resource limits 1214 and resource usage 1213.

For example, it is assumed that a particular database session is associated with a workload class including a total statement concurrency limit. If a task of a new statement of the database session is received by job scheduler 1211, and job scheduler 1211 determines, based on resource usage 1213, that execution of the task would result in exceeding the total statement concurrency limit, job scheduler 1211 waits to add the task to a job queue until at least one currently-executing statement is completed.

In another example, a database session is associated with a workload class including a statement thread limit. If job scheduler 1211 determines, based on resource usage 1213, that execution of the task associated with a statement would result in exceeding the thread limit for the statement, job scheduler 1211 waits to add the task to a job queue until at least one thread associated with the statement is freed.

Job scheduler 1211 may also consider priority values specified in resource limits 1214. The job queues on which job scheduler 1211 places tasks may be associated with different respective execution priority levels. Accordingly, when placing a task of a statement of a database session on a job queue, job scheduler 1211 may determine a statement priority value associated with the database session in resource limits 1214 and place the task on the corresponding job queue.

Statement execution consumes memory of database instance 110. Execution engine 111 may request memory from memory manager 1212 for use in statement execution. Memory manager 1212 allocates requested memory in response as is known in the art. However, according to some embodiments, memory manager 1212 first determines whether allocation of the requested memory would violate resource limits of the database session specified in resource limits 1214. Such resource limits may include limits on total memory consumed by concurrent statements of a given tenant (as shown in portion 1300) and a per-statement memory limit. In a case that a requested memory allocation would violate an applicable resource limit, memory manager 1212 may return an error to the memory requestor (e.g., execution engine 111).

Figure 14:
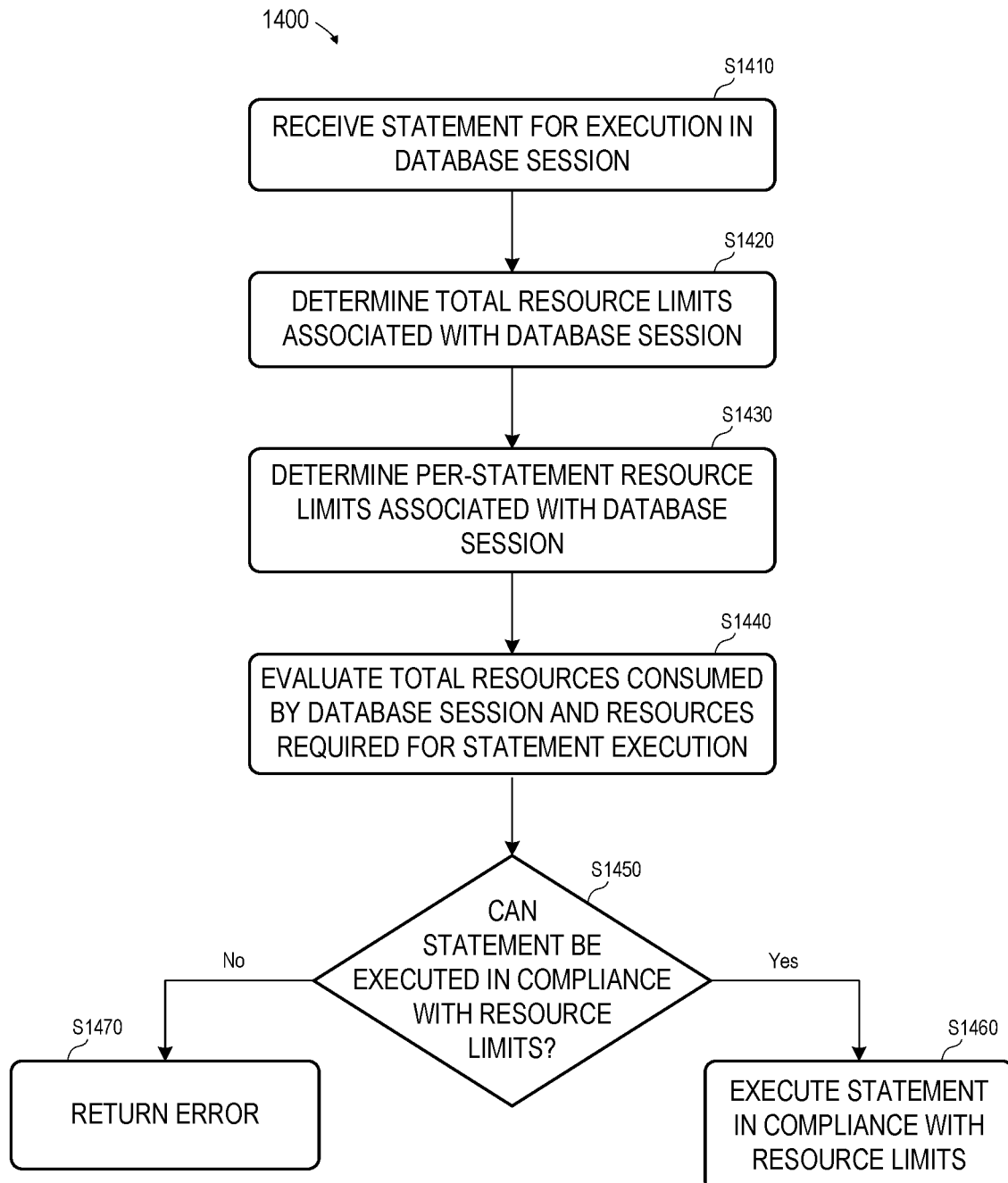
FIG. 14 is a flow diagram of a process to manage tenant-specific resource limits according to some embodiments.

FIG. 14 is a flow diagram of process 1400 to manage tenant-specific resource limits according to some embodiments. Process 1400 begins at S1410, at which a statement for execution is received. The statement is received from a database client and is associated with a database session. It will be assumed that a workload class associated with the database session has been previously determined as described above. Accordingly, resource limits of the determined workload class (and of any ancestor workload classes thereof) are associated with the database session prior to S1410 and may be stored, for example, in resource limits 1214.

Total resource limits associated with the database session are determined at S1420. In one example, job scheduler 1211 and memory manager 1212 read the total resource limits for the database session from resource limits 1214. These total resource limits may apply to all concurrently-executed statements of the database session. Assuming that the database session is associated with a single tenant, the total resource limits may be considered tenant-level resource limits.

Per-statement resource limits associated with the database session are determined at S1430. The per-statement resource limits may also be determined from resource limits 1214 or from a session context, and may include a per-statement memory limit and/or a per-statement thread limit. Each statement may be associated with a statement context including context variable values specifying applicable statement-level limits. As described above, a database session may be mapped to a workload class which defines per-statement resource limits and is descendant from a workload class which specifies tenant-level resource limits.

At S1440, the total resources currently consumed by the database session are determined. These totals may be tracked within resource usage 1213 as described above. Also determined at S1440 are resources required for execution of the statement received at S1410. Based on the total resources currently consumed, the total resource limits determined at S1420, and the resources required for execution of the statement, it is determined whether the statement can be executed in compliance with the total resource limits. For example, it may be determined whether a difference between the total resource limits and the total resources currently consumed is greater than the resources required for execution of the statement.

The determination at S1450 may be performed by different components of database instance depending on the types of resources under consideration. For example, job scheduler 1211 may evaluate compliance with total and per-statement limits related to statement concurrency and threads, while memory manager 1212 may evaluate compliance with the total and per-statement limits related to memory.

Flow proceeds to S1460 if it is determined that the statement can be executed in compliance with the resource limits associated with the database session. At S1460, database instance executes the statement, for example using job scheduler 1211 and memory manager 1212. If it is determined at S1450 that the statement cannot be executed in compliance with the resource limits associated with the database session, an error is returned at S1470.

In some embodiments, an error is returned only if the statement cannot be executed in compliance with memory-related resource limits. If the statement cannot be executed in compliance with concurrency or thread-related resource limits, flow may pause at S1450 until it is determined (due to completion of execution of a statement or freeing of a thread) that the statement can be executed in compliance with concurrency or thread-related resource limits. At that point, flow proceeds to S1460 to execute the statement.

Figure 15:
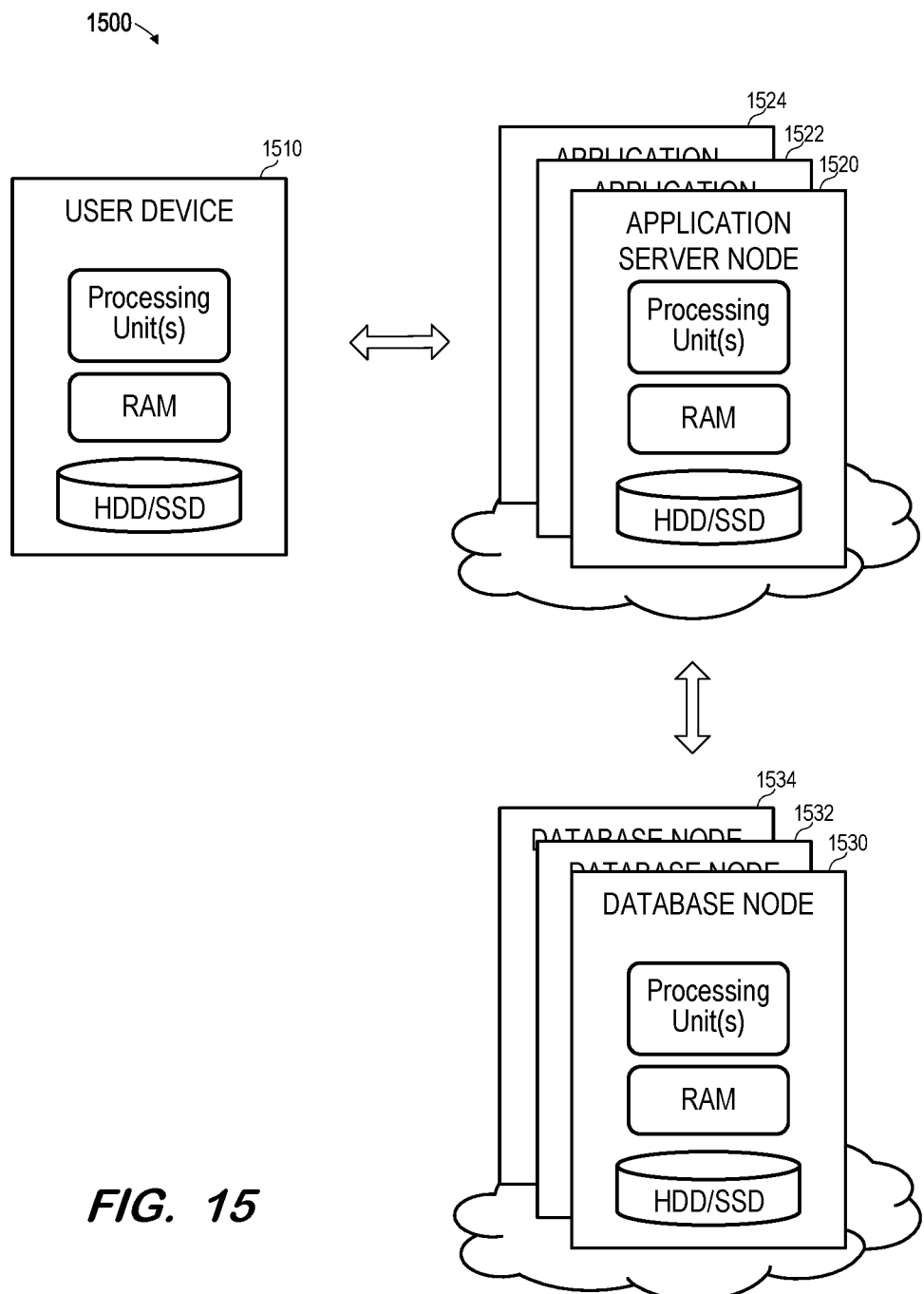
FIG. 15 is a block diagram of a cloud-based database architecture according to some embodiments.

FIG. 15 illustrates cloud-based database deployment 1500 according to some embodiments. User device 1510 may comprise any suitable computing system operable by a user to access a cloud-based application. User device 1510 may store and execute program code of a Web browser to access a Uniform Resource Locator (URL) associated with a login page of such an application. The Web browser may download and execute program code of a client-side component of an application as is known in the art.

Application server nodes 1520, 1522 and 1524 may host an application according to some embodiments. The application may comprise a multi-tenant application. Accordingly, database nodes 1530, 1532 and 1534 may host one or more database instances accessible to the multi-tenant application and providing native multi-tenancy as described herein. Each node of deployment 1500 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A computer-implemented method comprising:
    receiving, at a database instance hosting a plurality of database tenants, a statement for execution in a first database session associated with a first tenant;
    determining first tenant-level resource limits and first statement-level resource limits associated with the first tenant;
    determining, for each of one or more resources, a total amount previously consumed by the first database session;
    determining, for each of the one or more resources, an amount expected to be consumed by execution of the statement;
    determining that a sum of the total amount of the one or more resources previously consumed by the first database session and the amount expected to be consumed by execution of the statement is less than the first tenant-level resource limits and that the amount expected to be consumed by execution of the statement is less than the first statement-level resource limits; and
    in response to determining that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits, executing the statement.

2. A method according to claim 1, further comprising:
    pausing until it is determined that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits.

3. A method according to claim 2, wherein the first tenant-level resource limits comprise a statement concurrency limit.

4. A method according to claim 1, further comprising:
    receiving, at the database instance hosting a plurality of database tenants, a second statement for execution in a second database session associated with a second tenant;
    determining second tenant-level resource limits and second statement-level resource limits associated with the second tenant, the second tenant-level resource limits different from the first tenant-level resource limits and the second statement-level resource limits different from the first statement-level resource limits;
    determining, for the each of the one or more resources, a second total amount previously consumed by the second database session;
    determining, for each of the one or more resources, a second amount expected to be consumed by execution of the second statement;
    determining that a second sum of the second total amount of the one or more resources previously consumed by the second database session and the second amount expected to be consumed by execution of the second statement is less than the second tenant-level resource limits and that the second amount expected to be consumed by execution of the second statement is less than the second statement-level resource limits; and
    in response to determining that the second sum of the second total amount of the one or more resources previously consumed by the second database session and the second amount expected to be consumed by execution of the second statement is less than the second tenant-level resource limits and that the second amount expected to be consumed by execution of the second statement is less than the second statement-level resource limits, executing the second statement.

5. A system comprising:
    a memory storing executable program code; and a processing unit to execute the program code to cause the system to:
receive, at a database instance hosting a plurality of database tenants, a statement for execution in a first database session associated with a first tenant;
determine first tenant-level resource limits and first statement-level resource limits associated with the first tenant;
determine a total amount of one or more resources previously consumed by the first database session;
determine an amount of the one or more resources expected to be consumed by execution of the statement;
determine that a sum of the total amount of the one or more resources previously consumed by the first database session and the amount expected to be consumed by execution of the statement is less than the first tenant-level resource limits and that the amount expected to be consumed by execution of the statement is less than the first statement-level resource limits; and
execute the statement in response to the determination that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits.

6. A system according to claim 5, the processing unit to execute the program code to cause the system to:
pause execution of the statement until it is determined that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits.

7. A system according to claim 6, wherein the first tenant-level resource limits comprise a statement concurrency limit.

8. A system according to claim 5, the processing unit to execute the program code to cause the system to:
receive, at the database instance hosting the plurality of database tenants, a second statement for execution in a second database session associated with a second tenant;
determine second tenant-level resource limits and second statement-level resource limits associated with the second tenant, the second tenant-level resource limits different from the first tenant-level resource limits and the second statement-level resource limits different from the first statement-level resource limits;
determine a second total amount of each of the one or more resources consumed by the second database session;
determine a second amount of the one or more resources expected to be consumed by execution of the second statement;
determine that a second sum of the second total amount of the one or more resources previously consumed by the second database session and the second amount expected to be consumed by execution of the second statement is less than the second tenant-level resource limits and that the second amount expected to be consumed by execution of the second statement is less than the second statement-level resource limits; and
execute the second statement in response to the determination that the second sum of the second total amount of the one or more resources previously consumed by the second database session and the second amount expected to be consumed by execution of the second statement is less than the second tenant-level resource limits and that the second amount expected to be consumed by execution of the second statement is less than the second statement-level resource limits.

9. A non-transitory computer-readable medium storing program code executable by a computing system to cause the computing system to:
receive, at a database instance hosting a plurality of database tenants, a statement for execution in a first database session associated with a first tenant;
determine first tenant-level resource limits and first statement-level resource limits associated with the first tenant;
determine a total amount of one or more resources previously consumed by the first database session;
determine an amount of the one or more resources expected to be consumed by execution of the statement;
determine that a sum of the total amount of the one or more resources previously consumed by the first database session and the amount expected to be consumed by execution of the statement is less than the first tenant-level resource limits and that the amount expected to be consumed by execution of the statement is less than the first statement-level resource limits; and
execute the statement in response to determining that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits.

10. A medium according to claim 9, the program code executable by a computing system to cause the computing system to:
pause execution of the statement until it is determined that the sum of the total amount of the one or more resources previously consumed by the first database session and the amount expected to be consumed by execution of the statement is less than the first tenant-level resource limits and that the amount expected to be consumed by execution of the statement is less than the first statement-level resource limits.

11. A medium according to claim 10, wherein the first tenant-level resource limits comprise a statement concurrency limit.

12. A medium according to claim 9, the program code executable by a computing system to cause the computing system to:
receive, at the database instance hosting the plurality of database tenants, a second statement for execution in a second database session associated with a second tenant;
determine second tenant-level resource limits and second statement-level resource limits associated with the second tenant, the second tenant-level resource limits different from the first tenant-level resource limits and the second statement-level resource limits different from the first statement-level resource limits;
determine a second total amount of each of the one or more resources previously consumed by the second database session;

determine a second amount of each of the one or more resources expected to be consumed by execution of the second statement;

determine that a second sum of the second total amount of each of the one or more resources previously consumed by the second database session and the second amount expected to be consumed by execution of the second statement is less than the second tenant-level resource limits and that the second amount expected to be consumed by execution of the second statement is less than the second statement-level resource limits; and execute the second statement in response to the determination that the second sum of the second total amount of each of the one or more resources previously consumed by the second database session and the second amount expected to be consumed by execution of the second statement is less than the second tenant-level resource limits and that the second amount expected to be consumed by execution of the second statement is less than the second statement-level resource limits.

* * * * *